United States Patent
Huang et al.

(10) Patent No.: US 10,142,116 B2
(45) Date of Patent: Nov. 27, 2018

(54) INSPECTION DEVICE AND METHOD FOR POWERED DEVICES IN A POWER OVER ETHERNET SYSTEM

(71) Applicant: IC Plus Corp., Hsinchu (TW)

(72) Inventors: Philip Huang, Hsinchu (TW); Chef Hsiao, Hsinchu (TW); Pai-Yi Chiu, Hsinchu (TW)

(73) Assignee: IC PLUS CORP., Hsinchu (TW)

( * ) Notice: Subject to any disclaimer, the term of this patent is extended or adjusted under 35 U.S.C. 154(b) by 39 days.

(21) Appl. No.: 14/988,187

(22) Filed: Jan. 5, 2016

(65) Prior Publication Data
US 2017/0149574 A1   May 25, 2017

(30) Foreign Application Priority Data
Nov. 24, 2015 (TW) .............................. 104138946 A

(51) Int. Cl.
*G06F 1/32* (2006.01)
*H04L 12/10* (2006.01)
*G06F 1/26* (2006.01)
*G06F 1/28* (2006.01)

(52) U.S. Cl.
CPC .............. *H04L 12/10* (2013.01); *G06F 1/266* (2013.01); *G06F 1/28* (2013.01); *G06F 1/3209* (2013.01)

(58) Field of Classification Search
CPC ..... G06F 1/32; G06F 1/28; G06F 1/00; G06F 1/26
USPC ....... 713/300, 310, 320, 321, 322, 323, 324, 713/340, 375
See application file for complete search history.

(56) References Cited

U.S. PATENT DOCUMENTS

| | | | |
|---|---|---|---|
| 7,856,561 B2 | 12/2010 | Stineman, Jr. et al. | |
| 8,412,961 B2 * | 4/2013 | Gammel | G06F 1/266 455/572 |
| 9,488,997 B1 * | 11/2016 | Dwelley | G05F 1/462 |
| 2006/0164775 A1 * | 7/2006 | Stineman, Jr. | H04L 49/351 361/93.1 |
| 2006/0168458 A1 * | 7/2006 | Stineman, Jr. | H04L 12/10 713/300 |
| 2013/0120008 A1 * | 5/2013 | Torazzina | H04L 12/10 324/713 |

FOREIGN PATENT DOCUMENTS

CN    101031861 A    9/2007

* cited by examiner

*Primary Examiner* — Jaweed A Abbaszadeh
*Assistant Examiner* — Keshab R Pandey
(74) *Attorney, Agent, or Firm* — Muncy, Geissler, Olds & Lowe, P.C.

(57) ABSTRACT

An inspection device to determine whether a device connected to a Power over Ethernet system is suited for being powered, is configured to apply an inspection signal to the device and to measure a response signal thereto. The inspection signal includes a first, second, third and fourth voltage, wherein the first voltage and the third voltage are substantial the same and the second voltage and the fourth voltages are substantial the same, and an application period for applying the fourth voltage is sum of the application period for the second voltage and an extension period. The inspection device determines that the device is not suitable for being powered if a response signal exceeds predetermined ranges. A method to perform these inspections is also disclosed.

14 Claims, 6 Drawing Sheets

INSPECTION DEVICE AND METHOD FOR POWERED DEVICES IN A POWER OVER ETHERNET SYSTEM

CROSS REFERENCE TO RELATED APPLICATIONS

This non-provisional application claims priority under 35 U.S.C. § 119(a) on Patent Application No(s). 104138946 filed in Taiwan, Republic of China on 2015 Nov. 24, the entire contents of which are hereby incorporated by reference.

BACKGROUND OF THE INVENTION

Field of Invention

The present invention relates generally to a power over Ethernet system, and more particularly to an inspection device and method for power devices in a power over Ethernet system.

Related Art

Power over Ethernet (PoE) has found widespread application in many areas. For example, IEEE has released two standards that relate to PoE—IEEE 802.3af in 2003 and IEEE 802.3at in 2009. These standards are adopted by many applications. In this disclosure, these relevant standards relevant to the PoE will be referred to as the "PoE standard" hereinafter. PoE technology allows supplying electric power through Ethernet to devices such as Internet phone, wireless stations, network cameras, hubs, and even computers without the need of extra power outlet. Combining data transmission and power supply, PoE technology can reduce the cost and complexity of the overall network computing system.

In a power over Ethernet (PoE) system, the electric power is provided by the power source equipment (PSE) via Ethernet data cable to the powered device (PD). The power source equipment may include an Ethernet switch, a router, or other network switching and midspan devices. In the PoE system, a power device is connected to the network and configured to obtain or request power from the power source equipment over the network.

In a PoE system, the power source equipment may connect to multiple power devices through their network connecting ports, but may also connect to devices that will not or cannot obtain power from the power source equipment. In a real application, the powered device may include devices that are in compliance with the PoE Standard, and devices that are compatible with the PoE Standard. The PoE Standard provides that, before a power source equipment may provide power to a powered device, the power source equipment must determine whether the particular powered device is in accordance with the PoE standard. In addition, most of the power source equipment, or the power supply equipment that incorporates power source equipment, will also determine whether a device is compatible with the PoE standard. This may include a legacy device that is compatible with the PoE Standard. If compatible, the power source equipment will also provide power to such compatible device.

Under the PoE standard, when carrying out said inspection, the power source equipment provides a signal to the connecting port of a target device, and detects the response signal from the connecting port. If the response signal indicates a signature resistance ranging from 19k to 26.5k ohms, then the device is determined to be a powered device in compliance with the PoE standard. The PoE Standard also specifies that the voltage provided by the power source equipment should be between about 2.8 V and 10 V, the current should be less than about 5 mA, and the voltage difference of the testing signal should be more than 1 V.

During the inspection, a typical method is for the power source equipment to apply a voltage or current to the particular connecting port, and then to measure the response signal from the target device after a predetermined period. The signature resistance is calculated based on the current/voltage relationship from the two signals. If a current is applied, the current is normally in the range of 150 μA to 400 μA, and the voltage of the connecting port is measured to calculate the value of the signature resistance. In this case, a target device in compliance with the PoE standard will cause the power sourcing device to detect an about 2.8 V to 10 V voltage drop in the connecting port.

Alternatively, if the testing signal is a voltage signal, the voltage is generally between about 2.8V to 10V, and the detected current value shall be between about 87.5 uA to 625 uA.

Based on the result, the power source equipment will decide whether to perform classification on the powered device. From the classification, the power source equipment may provide different power to different the power devices.

U.S. Pat. No. 7,856,561 provides an equipment to detect a legacy device in a PoE system. The power source equipment therein will apply a serial signal, including current I1 and I2, to the target connecting port. Respectively after 160 ms, it will detect the voltage of the connecting port as V1 and V2. Based on the ratio between the voltage difference and current difference, it will determine whether the target device associated with the connecting port is a standard-compliant powered device, or a compatible device. Specifically, it will calculate the value of Rdet=(V1−V2)/(I1−I2). If Rdet is within a certain range, it will determine that the target device is a standard-compliant powered device. If the value of Rdet is less than the predetermined value or is a negative value, then it will determine that the target device is a legacy device. If none of the above conditions has been met, then it will determine that the device is neither a standard-compliant powered device nor a legacy device.

Chinese Patent No. CN101031861 discloses a classification method for the powered devices in a wired data telecommunication network. It applies multiple periodic testing signals to a powered device to generate a multi-group classification result. The classification result is mapped to an index table to produce a code used as the classification code.

In addition to the voltage range requirement, the PoE standard also requires that the capacitance of the powered device shall be 0.15 uF. If the capacitance is above 10 uF, it must refuse to supply power. Under this requirement, the power source equipment must also determine the capacitance of the target device to determine whether it is a powered device that it can supply power to.

U.S. Pat. No. 8,412,961 discloses a circuit and method for detecting a legacy device in a power over Ethernet system. The method can determine whether the target device connecting to the particular connecting port is a powered device in compliance with the PoE standard or a legacy device. The method uses a three-level voltage or current as the testing signal, and based its determination on the detected current or voltage measured in the connecting port. The patent also discloses that the three levels can in fact be two levels, whereas the first level and the third level are the same, i.e., the third level applies the same measurement as the first level does.

The patent also claims to detect the capacitance of the target device. However, capacitance calculation is more complicated than voltage calculation, and it requires CPU resource. In addition, for a device with capacitance that is above the range specified by the PoE Standard, it will take longer to charge and discharge, and the device may not yet reach steady state during voltage measurement. If so, it will cause measurement error. According to the patent, the measurement equipment will need to take multiple samples in order to obtain current/voltage signals that are representative as the steady state signal.

Prior PoE system is limited by its ability to determine the powered device due to the variety of devices connected to the connecting ports. A lot of them can be unknown to the PoE system. These devices have different characteristics that often affect the detection accuracy. For example, the resistance and capacitance characteristics of the target device often affect the response signal. This causes incorrect the sampled voltage/current values to be incorrect, especially when it has yet to reach the steady state.

Furthermore, there is yet to exist an easy method of determining the capacitance of the target device. Although the capacitance and the resistance of the target device may be separately measured, but whether a device is suitable for supplying power to is in fact based on the capacitance-resistance combination. Moreover, even with the capacitance-resistance combination, it is necessary to go through a complicated process to come to a correct determination.

SUMMARY OF THE INVENTION

It is an objective of the present invention to provide a novel inspection device for the PoE system, with improved inspecting accuracy for the powered device.

It is an objective of the present invention to provide a novel inspection device for the PoE system, with the reduced overall inspecting time for the powered device.

It is an objective of the present invention to provide a novel inspection device for the PoE system, with the ability to correctly rule out a device that is not a powered device to avoid unnecessary testing.

It is an objective of the present invention to provide an inspection method that has the above advantages.

In one aspect, the present invention features an inspection device for the powered device in the PoE system. The inspection device is incorporated into a power source equipment of the PoE system. The power source equipment provides at least one connecting port, which allows a powered device to connect thereto via a network wire. The inspection device may sequentially apply to the connecting port a first voltage $V1$, a second voltage $V2$, a third voltage $V3$, and a fourth voltage $V4$. Among them, the first voltage and the third voltage are substantially the same, the second voltage and the fourth voltage are substantially the same, and the application period for the fourth voltage is the sum of the application voltage for the second voltage with an extension period. The extension period is about 0.2-1.5 (preferably 0.5-1.0) times the application period for the second voltage.

The inspection device further comprises means for measuring at the connecting port a first current $I1$ after a predetermined period following applying the first voltage $V1$, measuring a second current $I2$ after the predetermined period following applying the second voltage $V2$, measuring a third current $I3$ after the predetermined period following applying the third voltage $V3$, and measuring a fourth current $I4$ after the predetermined period following applying the fourth voltage $V4$. In addition, it calculates a first resistance by $Rdet=(V1-V2)/(I1-I2)$ and a second resistance by $Rdet2=(V3-V4)/(I3-I4)$. The inspection device determines that the connecting port is not connected to a suitable powered device if (1) any of the first current $I1$, the second current $I2$, the third current $I3$, and the fourth current $I4$ exceeds a first predetermined value, or (2) $\Delta Rdet=Rdet1-Rdet2$ is greater than a second predetermined value, and otherwise determines that the connecting port is connected to the suitable powered device.

The present invention provides an inspection device of power source equipment for detecting a powered device of a power over Ethernet system, wherein the power source equipment comprises a connecting port adapted to connect to a powered device through a network wire, and wherein the inspecting device connects to the connecting port. The inspection method comprises applying a testing voltage signals to the connecting port, whereas the testing voltage signals comprise, sequentially, a first voltage $V1$, a second voltage $V2$, a third voltage $V3$ and a fourth voltage $V4$, wherein the first voltage $V1$ and the third voltage $V3$ are substantially the same, the second voltage and the fourth voltage are substantially the same, and an application period for the fourth voltage $V4$ is a sum of an application period for the second period $V2$ with an extension period. In addition, it measures at the connecting port a first current $I1$ after a predetermined period following applying the first voltage $V1$, measuring a second current $I2$ after the predetermined period following applying the second voltage $V2$, measuring a third current $I3$ after the predetermined period following applying the third voltage $V3$, and measuring a fourth current $I4$ after the predetermined period following applying the fourth voltage $V4$. It then calculates a first resistance by $Rdet1=(V1-V2)/(I1-I2)$ and a second resistance by $Rdet2=(V3-V4)/(I3-I4)$. Finally, it determines that the connecting port is not connected to a suitable powered device if (1) any of the first current $I1$, the second current $I2$, the third current $I3$, and the fourth current $I4$ exceeds a first predetermined value, or (2) $\Delta Rdet=Rdet1-Rdet2$ is greater than a second predetermined value, and otherwise determining that the connecting port is connected to the suitable powered device.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below and the claims. The drawings are not necessarily to scale. Emphasis is instead generally placed upon illustrating the general principles of the present invention. In these drawings, like numerals are used to indicate like parts throughout the various views.

DETAILED DESCRIPTION OF THE INVENTION

The present invention will be apparent from the following detailed description, which proceeds with reference to the accompanying drawings, wherein the same references relate to the same elements.

The present invention provides a novel inspection device and method for the PoE system. It allows the power source equipment of a PoE system to determine, in a single inspection step, whether the devices connected thereto is suitable for supplying power to. It also has the ability to correctly rule out a device that is not a powered device to avoid unnecessary testing. The inspection device can detect the voltage and capacitance characteristics of a target device at the same time to achieve the correct determination.

Figure 1:
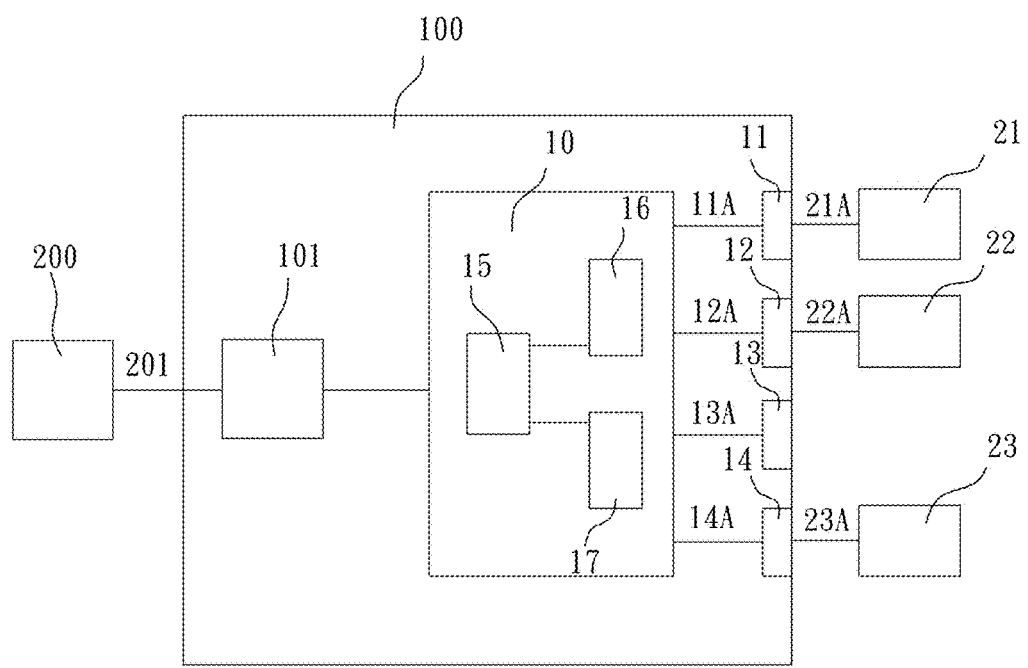
FIG. 1 illustrates an embodiment of the inspection device for the PoE system.

FIG. 1 illustrates an embodiment of the inspection device for the PoE system. As illustrated, the inspection device 10, used for inspecting the powered devices in the PoE system, is incorporated into a power source equipment 100 of the PoE system. Together with the power source equipment 100 and the power source 200, they constitute the PoE system. The power source equipment 100 provides power, from the power source 200 and through the power cable 201 to the powered, to the powered devices. The power source 200 provides power through the power cable 201 into the I/O Interface 101 of the power source equipment, and finally into the inspection device 10. The power source equipment 100 also provides multiple connecting ports 11, 12, 13 and 14. They allow connection to the external devices 21, 22, 23 through the network wire 21A, 22A, and 23A. Although FIG. 1 illustrates only four connecting ports, a person of ordinary skill in the art will recognize that the number of ports can be greater or less than the number illustrated. For example, a typical power source equipment 100 can offer 8 connecting ports. The present invention is applicable to these cases as well. As illustrated, there are three external devices 21, 22, and 23 connecting to the connecting ports 11, 12 and 14. There is no external device connecting to the connecting port 13. The external devices 21, 22 and 23 may be powered devices in compliance with the PoE standard, may be compatible powered devices, may be incompatible powered devices, or may be just a typical capacitor load or resistor load.

The power source equipment 100, via 4 sets of signal wires 11A, 12A, 13A, and 14A, connects to the connecting ports 11, 12, 13, and 14. The function of the power source equipment 100 is to transfer the power from the power source 200 to the external devices 21, 22 and 23 that are capable of receiving power.

In general, the signal wires 11A, 12A, 13A and 14A may each comprise 2 pairs of signal lines for transmitting electric signal and power. At the same time, the network wires 21A, 22A, and 23A may each comprise 2 pairs of signal lines in the shape of a twisted pair. A person of ordinary skill in the art would recognize the that the number of lines inside the signal wire or the network wire may vary, as long as each of them has a pair of signal wires.

The PoE system configured as above is well know in the art, and various techniques have been reported in the literature, including the IEEE 802.3af, and IEEE 802.3at standards.

According to the PoE standard, a standard-compliant power source equipment must first conduct inspection and classification toward the external devices 21, 22 and 23 before providing power to a suitable external device. For those devices that are in compliance with, or compatible with, the PoE standard, there currently exists methods and devices to inspect and classify these devices, such as the disclosure in the U.S. Pat. No. 7,856,561 and U.S. Pat. No. 8,412,961. However, there is yet an easy solution to make a correct determination for devices that are not fully compatible with the PoE standard. As previously described, each powered device has different device characteristics, especially different resistance—capacitance combination characteristic. As such, one cannot simply conduct a resistance and capacitance inspection to expect to accurately determine the suitability of supplying power from the power source equipment.

In an ideal situation, all external devices connected the connecting ports 11, 12 and 14 are powered devices in compliance with or compatible with the PoE standard. During the inspection stage, these external devices can be called "target devices." When it is determined that a target device is in compliance with the PoE standard, the device is then called a powered device.

Figure 2:
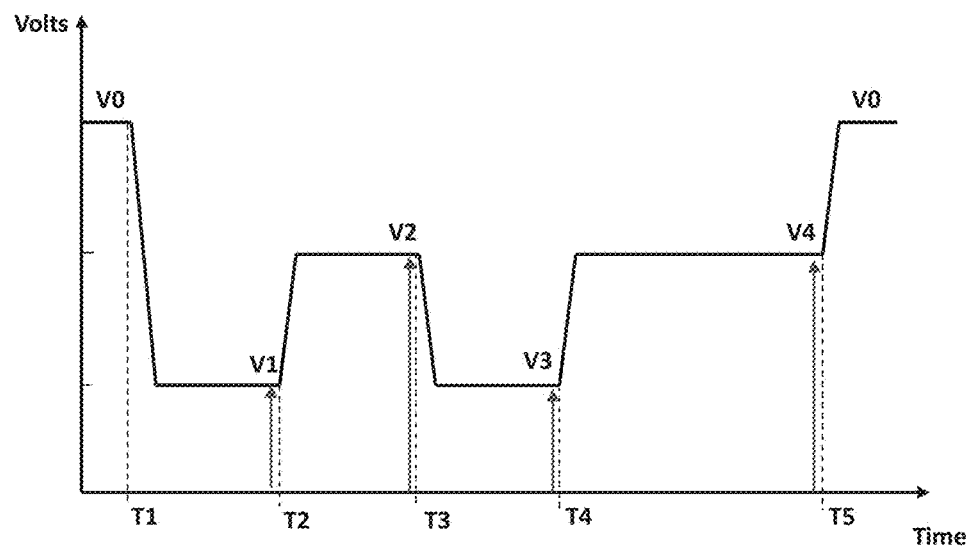
FIG. 2 illustrates the voltage and current relationship according to an embodiment of the present invention when the testing voltage signals are applied to a standard-compliant or compatible powered device.
Figure 2:
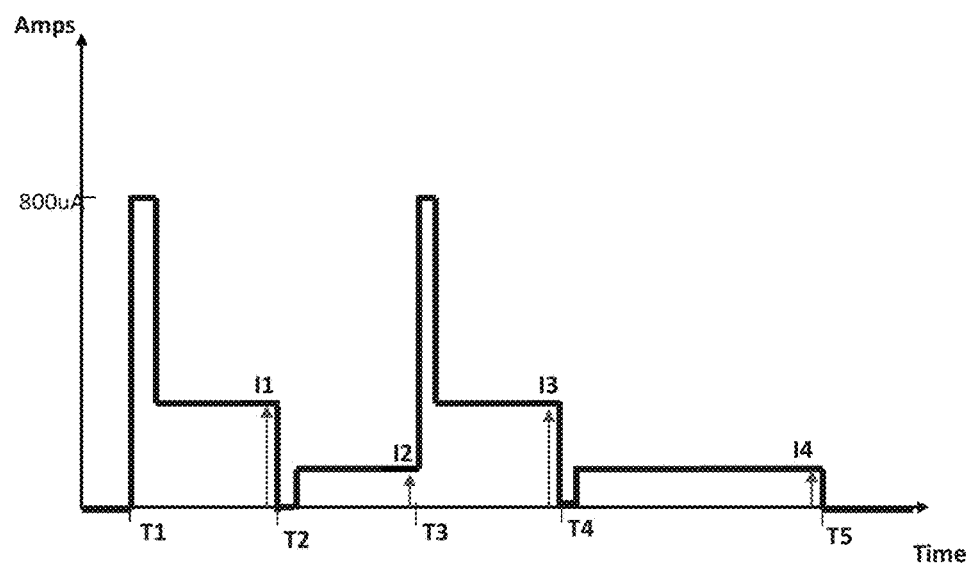

FIG. 2 illustrates the voltage and current relationship according to an embodiment of the present invention when the testing voltage signals are applied to a standard-compliant or compatible powered device. According to an embodiment of the present invention, the inspection method for the powered device may apply testing voltage signals to the connecting port, and then measures the response signals from the connecting port. The target device in FIG. 2 has a capacitance value of 0.1 uF, which is in compliance with the IEEE standard.

The invention provides a novel inspection method for the powered device in the PoE system. The method is applied to the powered device in the PoE system of FIG. 1. When a target device is connected to the connecting port, the method will apply voltage signals to the connecting port. The voltage signals include a first voltage V1, a second voltage V2, a third voltage V3 and a fourth voltage V4. The currents I1, I2, I3, and I4 are measured in the connecting port respectively after a predetermined period following applying V1, V2, V3 and V4.

In some embodiments of the present invention, the first voltage and the third voltage are substantially the same, and the second voltage and the fourth voltage are substantially the same. As illustrated in FIG. 2, V1=V3=−8 V, V2=V4=−4 V. A person of ordinary skill in the art would recognize that other voltage values can also be applicable in accordance with the present invention. In addition, the application period of the fourth voltage may be longer than the application period of the second voltage. According to some embodiments of the present invention, the V4 application period is 1.2-2.5 times (preferably 1.5-2.0 times) the V2 application period. That is, V4 application period is the sum of the V2 application period with a predetermined extension period. The extension period may, for example, be 0.2-1.5 (preferably 0.5-1.0) times the V2 application period. In the illustrated example, the V2 application period is 72 ms, and the V4 application period is 108 ms. The V1 application period and the V3 application period are both 72 ms. The extension period for applying the voltage can allow the target device to reach a steady state, thereby providing accurate measurement result and the comparison information.

In FIG. 2, the target device has a capacitance value of 0.1 uF. The inspection device 10 in FIG. 1 initially applies to the connecting port a voltage V0 of 0 V. Then, the inspection device 10 applies a current-limiting (800 uA) voltage of −8 V at time T1 toward the connecting port. The voltage of the target device will reach the expected −8 V in a very short amount of time, such as in 4 ms. Thus, the inspection device 10 can detect current value I1 around time T2. Next, the inspection device 10 at time T2 applies a predetermined voltage of −4 V to cause the voltage of the target device to reach the expected −4 V shortly after time T2. Thus, the inspection device 10 can detect current value I2 around time T3. Next, the inspection device 10 at time T3 applies a predetermined voltage of −8 V to cause the voltage of the target device to reach the expected −8 V shortly after time T3. Thus, the inspection device 10 can detect current value I3 around time T4. Finally, the inspection device 10 at time T4 applies a predetermined voltage −4 V to cause the voltage of the target device to reach the expected −8 V shortly after time T5. Thus, the inspection device 10 can detect current value I4 around time T5.

In this case, the detection device 10 can obtain the value of Rdet1 and Rdet2 by Rdet=(V1−V2)/(I1−I2) and Rdet2=(V3−V4)/(I3−I4). It then determines whether to conduct the classification step regarding the target device connected to the connecting port, and then provides power based on the classification result.

If any of the external devices 21, 22 and 23 connecting to the connecting port 11, 12, 13 and 14 does not conform to the PoE standard, such as due to their respective resistance and/or capacitance characteristics, the inspection step previously described will not produce the result as shown in FIG. 2.

Figure 3:
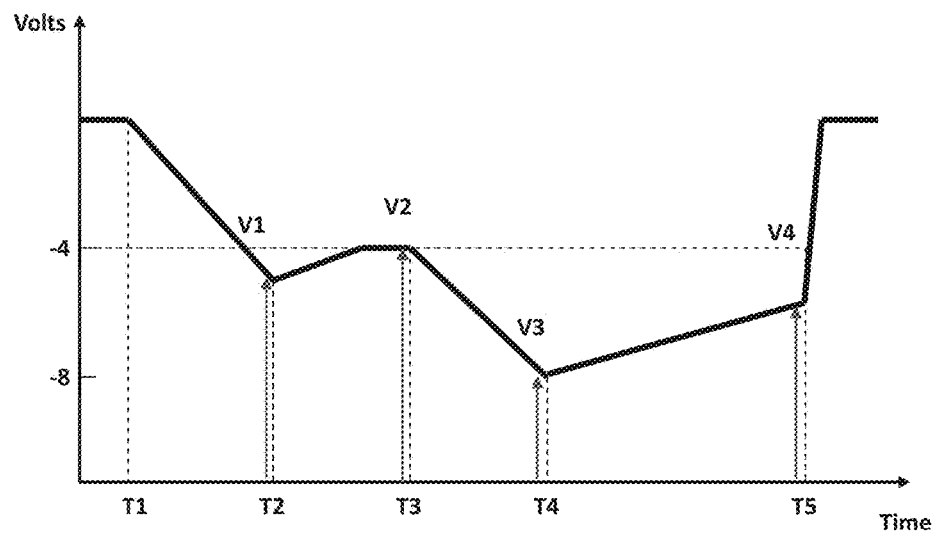
FIG. 3 illustrates the voltage and current relationship according to an embodiment of the present invention when the testing voltage signals are applied to another unsuitable device.
Figure 3:
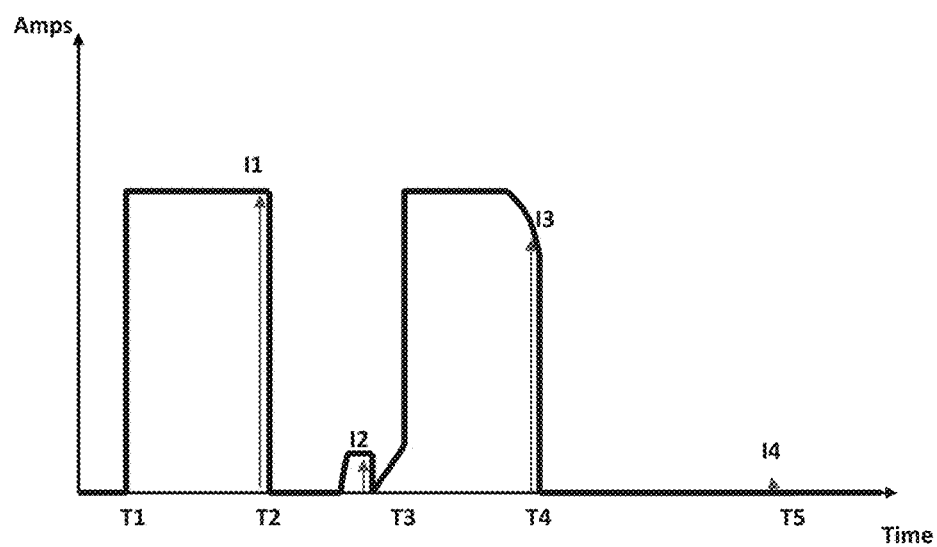

FIG. 3 illustrates the voltage and current relationship according to an embodiment of the present invention when the inspection method according to FIG. 2 applies testing voltage signals to the connecting port for an unsuitable device in a PoE system, measures the response signals from the connecting port, and calculate its relationship with respect to the testing voltage signals.

In FIG. 3, the device connected to the connecting port has a resistance value of 32k ohms. Thus it is higher than the specified range by the PoE standard. It also has a higher capacitance value of 10 uF. The result for the inspection method according to an embodiment of the present invention is illustrated in FIG. 3. The above diagram illustrates the voltage values from the connecting port after sequentially applying −8 V, −4 V, −8 V, and −4 V to the connecting port of the target device. The below diagram illustrates the response current values from the connecting port of the target device after 70 ms following the applying of the voltages.

In FIG. 3, the inspection device 10 in FIG. 1 applies to the connecting port a first voltage V1 and a second voltage V2. It measures the response signals in terms of the current values after some amount of time. For example, it applies V0 of 0 V at T0 as the initial voltage. At time T1, it applies to the connecting port with V1 of −8 V, and at time T2 applies V2 of −4 V. Because the target device capacitance is as high as 10 uF, the charging speed it slow. At time T2, it can only measure a voltage of −5 V at the connecting port. During the time when the voltage is rising up to −4 V, because the capacitor has enough time to discharge, it can measure −4 V at time T3. In this case, the current value in the connecting port is about 800 uA of I1 at time T2, and 125 uA of I2 at time T3.

This shows that the device connected to the connecting port does not conform to the PoE standard. Because the capacitance value is too high, the measured current value is close to the current-limiting value of 800 uA following the applying of the first voltage.

Figure 4:
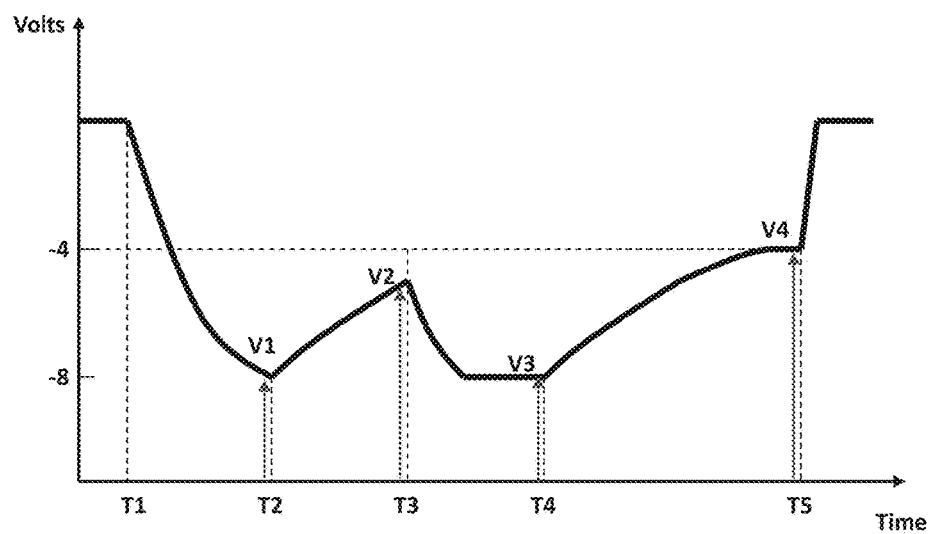
FIG. 4 illustrates the voltage and current relationship according to an embodiment of the present invention when the testing voltage signals are applied to yet another unsuitable device.
Figure 4:
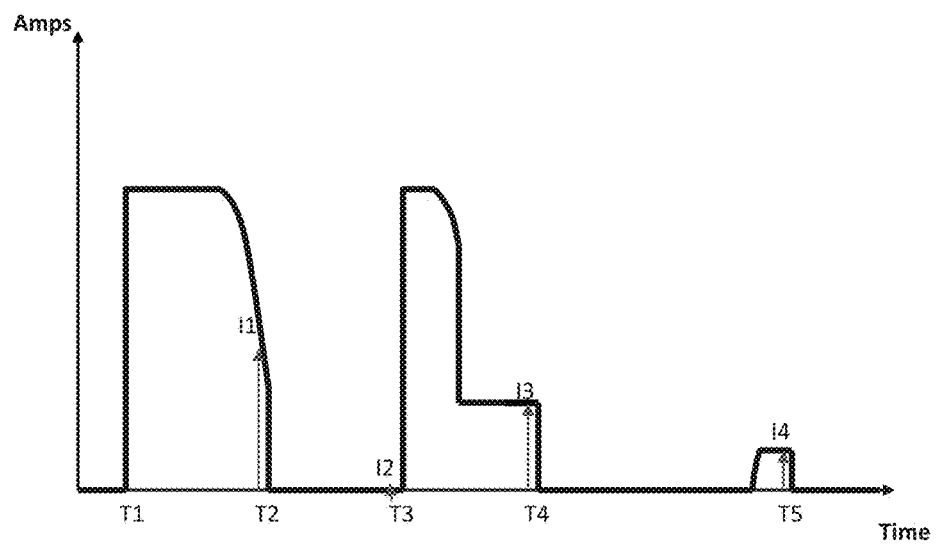

FIG. 4 illustrates another voltage and current relationship according to an embodiment of the present invention when the inspection method according to FIG. 2 applies testing voltage signals to the connecting port for an unsuitable device in a PoE system. It then measures the response signals from the connecting port and calculate the relationship with respect to the testing signals.

In FIG. 4, the device connected to the connecting port has a resistance value of 32k ohms. This value is higher than the specified range by the PoE standard. It also has a higher capacitance value of 5.15 uF. As illustrated, the inspection device 10 in FIG. 1 of the power source equipment applies V0 of 0V at T0 as the initial voltage. At time T1, it applies to the connecting port V1 of −8V, and at time T2 applies V2 of −4V. Although the capacitor of the target device is not as high as the one in FIG. 3, it still has the value of 5.15 uF and will cause the charging speed to be slow. As a result, at time T2, the inspection device may be able to measure the −8V voltage at the connecting port, but the external device will not have enough time to fully discharge when the voltage is rising up to −4 V. Thus, at time T3, the measured voltage at the connecting port is less than −4 V, such as −5 V as depicted in the above diagram of FIG. 4. In this case, the current value in the connecting port is about 250 uA of I1 at time T2, but close to 0 uA of I2 at time T3, as depicted in the below diagram of FIG. 4.

This shows that the device connected to the connecting port does not conform to the PoE standard. Because the capacitance value is too high, the measured current value is close to 0 following applying the second voltage V2.

Figure 5:
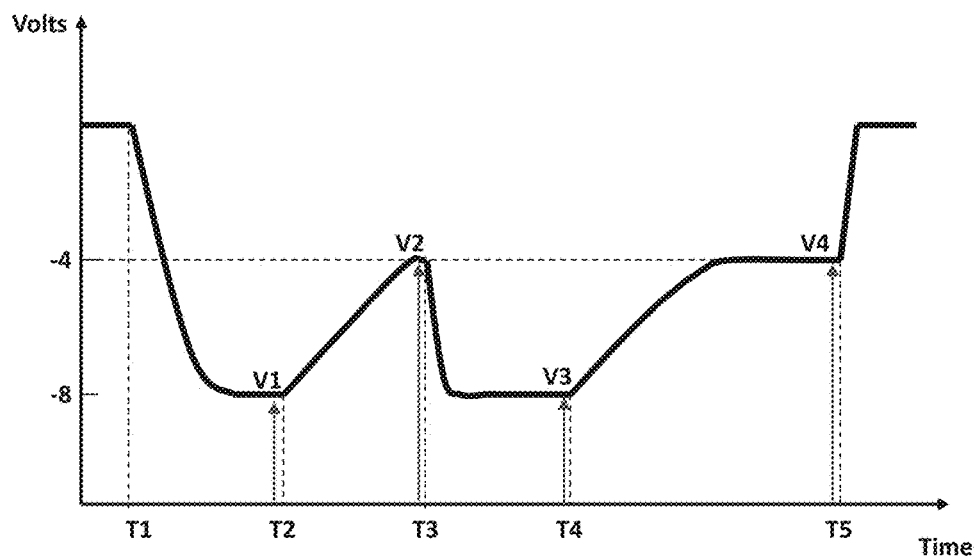
FIG. 5 illustrates the voltage and current relationship according to an embodiment of the present invention when the testing voltage signals are applied to yet an unsuitable device.
Figure 5:
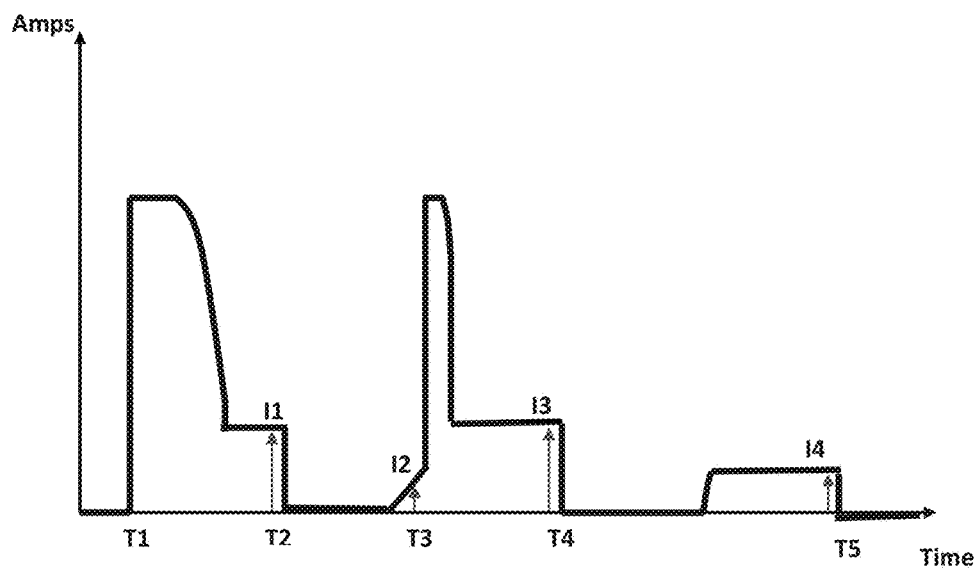

FIG. 5 illustrates another voltage and current relationship according to an embodiment of the present invention when the inspection method according to FIG. 2 applies testing voltage signals to the connecting port for an unsuitable device in a PoE system. It then measures the response signals from the connecting port and calculate the relationship with respect to the testing signals.

In FIG. 5, the device connected to the connecting port has a resistance value of 32k ohms. Thus it is higher than the specified range by the PoE standard. It also has a higher capacitance value of 3.5 uF. The inspection device 10 in FIG. 1 of the power source equipment applies V0 of 0 V at T0 as the initial voltage. At time T1, it applies to the connecting port V1 of −8 V, and at time T2 applies V2 of −4 V. The capacitance of the target device is not as high as the ones in FIG. 3 and FIG. 4, and is closer to the range specified by the PoE standard. This will cause the conventional inspection method to determine it to a standard-compliant powered device or compatible powered device.

Specifically, the inspection device 10 in FIG. 5 will provide inspection testing voltage signals to the connecting port for the target device. At time T2, the measured voltage for the connecting port may be −8 V, and the measured voltage may be −4 V at time T3. At these moments, the measured current value at the connecting port may be I1 of 250 uA at time T2. At time T3, the measured current value of I2 may be anywhere in the range of 0 to 125 uA. This is because the capacitance value of the target device is only slightly higher the standard range, and the target device will be able to finish charging after the voltage change. Because the measured current in T3 is within the normal range, a conventional inspection method will use the result for determination. However, due to the high capacitance value of 3.5 uF, the current has in fact not yet reached the steady state at time T3. Therefore, the current value of I2 is incorrect, and so is the determination result based on the value of I2.

In order to solve this problem, the inspection method according to an embodiment of the present invention provides an additional third voltage V3 and fourth voltage V4 to inspect the powered device of the PoE system. The value of the third voltage V3 is substantially the same as the value of V1, and the value of the fourth voltage V4 is substantially the same as the value of V2. For example, V1=V3=−8V, and V2=V4=−4V. The application period of V4 is longer than the application period of V2 in order to stabilize the value of V4. For example, the application periods for V1, V2 and V3 may be 72 ms, but the application period of V4 may be 108 ms. As illustrated in FIG. 5, when the inspection device applies −8V to the connecting port, it can measure −8V at the connecting port moments after T3.

However, when the inspection device applies −4V at time T4, it will take quite some time, such as longer than 72 ms, until the measured voltage of the connecting port to reach −4V.

In accordance with embodiments of the present invention, after the inspection device applies the third and fourth voltage signals, it can measure the current 250 uA near time T4, and the current 125 uA near time T5, thereby arriving at the correct inspection result.

Therefore, under the condition shown in FIG. 5. The Rdet value calculated based on I1 and I2 value (Rdet1=(V1−V2)/(I1−I2)) will be much less than the Rdet value calculated value based on I3 and I4 (Rdet2=(V3 V4)/(I3−I4)). At the very least, there will be significant difference between the two. From the difference, one can determine that the target device connected to the connecting port is still not a confirming powered device.

Based on the above analysis, the inspection device 10 for the powered device of the PoE system provides an inspection computing unit 15 that is configured to control the application of voltage signals to the connecting port 11, 12, 13 and 14. From the measured responding current values from any of the connecting ports 11, 12, 13 and 14, it is also configured to determine whether the external device connected to the connecting port is a standard-compliant powered device or a compatible powered device. The inspection device 10 also includes a power supply 16 to supply current-limiting voltage signals to the particular connecting port 11, 12 13 or 14. In addition, the inspection device 10 includes a current measurement device 17 to measure the current value of the connecting ports 11, 12, 13 and 14.

According to embodiments of the present invention, the inspection device 10 may be configured to apply a series of testing voltage signals toward the connecting port. These testing voltage signals may be, sequentially, the first voltage V1, the second voltage V2, and third voltage V3, and the fourth voltage V4. Among them, the values of the first voltage and the third voltage are substantially the same, and the value of the second voltage and the value of the fourth voltage are substantially the same. In addition, the application period of the fourth voltage is the sum of the application period of the second voltage with a predetermined extension period. The extension period may be 0.2-1.5 (preferably 0.5-1.0) times the application period of the second voltage.

The inspection device 10 may be further configured to measure the first current I1, second current I2, third current I3 and fourth current I4 respectively after a plurality of predetermined times following the application of the first voltage, second voltage, third voltage, and fourth voltage. It can then calculate Rdet1=(V1−V2) (I1−I2) and Rdet2=(V3−V4)/(I3−I4). When any of I1, I2, I3, or I4 is beyond a first predetermined value, then it will determine that the connecting port is not connected to a suitable powered device. When ΔRdet=Rdet1−Rdet2 is greater than a second predetermined value, it may determine that connecting port is not connected to a suitable powered device. Otherwise, it will determine that a suitable powered device has been connected to the connecting port.

In a preferred embodiment of the present invention, the first predetermined value can be set between 0.02 mA and 0.78 mA, preferably between 0.04 mA and 0.76 mA. The second predetermined value can be set between −1000 and 1000, preferably between −500 and 500.

According to some embodiments of the present invention, the inspection method for the powered device in a PoE system may be executed in the power source equipment of the PoE system. The power source equipment may provide at least one connecting port and an inspection device. The connecting port may allow a powered device to connect thereto through the network wire, and the inspection device may connect to the connecting port.

Figure 6:
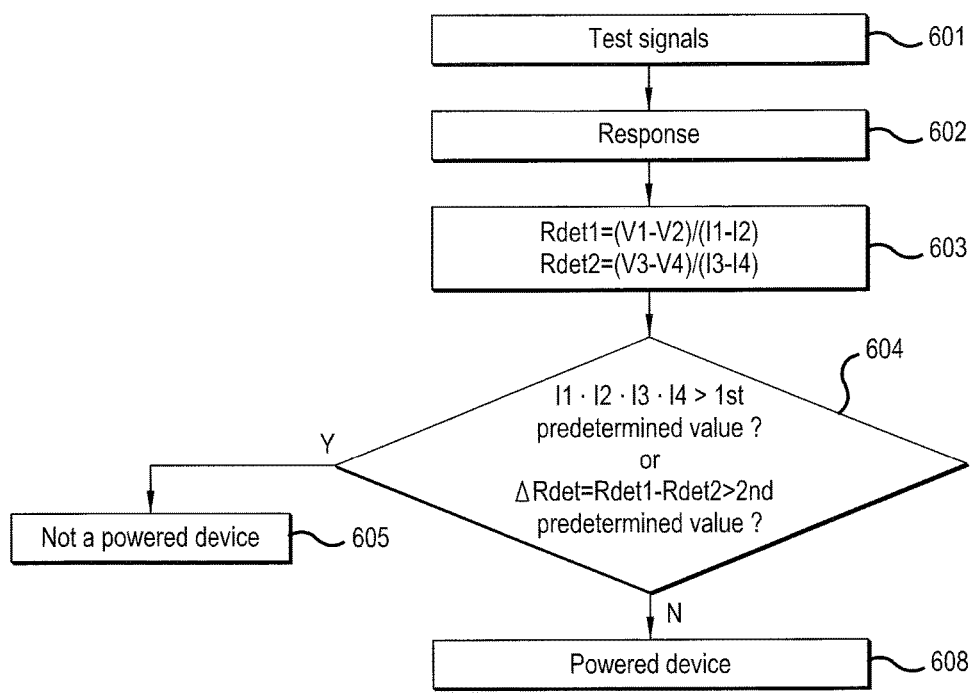
FIG. 6 illustrates the inspection method for the powered device according to an embodiment of the present invention.

FIG. 6 illustrates the inspection method for the powered device according to an embodiment of the present invention. As illustrated, the inspection method for the powered device of a PoE system includes the step 601, applying testing voltage signals from the inspection device to the connecting port. The testing signals may be, sequentially, a first voltage V1, a second voltage V2, a third voltage V3, and a fourth voltage V4. Among them, the values of the first voltage and the third voltage are substantially the same, and the value of the second voltage and the value of the fourth voltage are substantially the same. In addition, the application period of the fourth voltage is the sum of the application period of the second voltage with a predetermined extension period. The extension period may be 0.2-1.5 (preferably 0.5-1.0) times the application period of the second voltage.

In step 602, the inspection method measures a first current I1 from the connecting port after a predetermined period following applying a first voltage; measures a second current I2 from the connecting port after a predetermined period following applying a second voltage: measures a third current I3 from the connecting port after a predetermined period following applying a third voltage; and measures a fourth current I4 from the connecting port after a predetermined period following applying a fourth voltage. Then, at step 603, the inspection device will calculate Rdet1=(V1−V2)/(I1−I2) and Rdet2=(V3−V4)/(I3−I4). Then, at step 604, the inspection device will determine whether any of I1, I2, I3, or I4 is beyond a first predetermined value. If yes, at step 605, it will determine that the connecting port is not connected to a suitable powered device. Otherwise, at step 606, the inspection device will determine whether ΔRdet=Rdet1−Rdet2 is greater than a second predetermined value. If yes, at step 607, it will determine that the connecting port is not connected to a suitable powered device. Otherwise, at step 608, it will determine that a suitable powered device has been connected to the connecting port.

As described above, in the preferred embodiments of the present invention, the first predetermined value can be set between 0.02 mA and 0.78 mA, preferably between 0.04 mA and 0.76 mA. The second predetermined value can be set between −1000 and 1000, preferably between −500 and 500.

As described, the present invention provides a novel inspection device and method to inspect powered device of a PoE system. It may only need one inspection cycle to rule out unsuitable external device and to obtain the correct value of Rdet.

In the embodiment above, the inspection device 10 is to provide voltage signals to the connecting port and to measure the responding current values after some period. A person of ordinary skill in the art would recognize that one can also apply current signals to the connecting port, measures the responding voltage values, and obtains the corresponding resistance values. In addition, even though the first and third voltage signal values are higher than the second and fourth voltage signal values in the previous embodiments, a person of ordinary skill in the art would recognize that it is also practical to have the first voltage and third voltage signal values to be lower than the second and fourth voltage signal values.

Although the invention has been described with reference to specific embodiments regarding the inspection device and method for the powered device in a PoE system, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An inspection device of power source equipment for detecting a powered device of a power over Ethernet system, wherein the power source equipment comprises a connecting port adapted to connect to the powered device through a network wire, and wherein the inspecting device connects to the connecting port, the inspection device comprising:
    an inspection computing unit that controls application of a plurality of testing voltage signals to the connecting port, whereas the plurality of testing voltage signals comprise, sequentially, a first voltage V1, a second voltage V2, a third voltage V3 and a fourth voltage V4, wherein the first voltage V1 and the third voltage V3 are substantially the same, the second voltage V2 and the fourth voltage V4 are substantially the same, and an application period for the fourth voltage V4 is a sum of an application period for the second period V2 with an extension period;
    a power supply that supplies the plurality of testing voltage signals to the connecting port; and
    a current measurement device that measures at the connecting port a first current I1 after a predetermined period following applying the first voltage V1, measures a second current I2 after the predetermined period following applying the second voltage V2, measures a third current I3 after the predetermined period following applying the third voltage V3, and measures a fourth current I4 after a time period, which is longer than the predetermined period, following applying the fourth voltage V4, wherein
    the inspection device calculates a first resistance by Rdet1=(V1-V2)/(I1-I2) and a second resistance by Rdet2=(V3-V4)/(I3-I4); and
    the inspection device determines that the connecting port is not connected to a suitable powered device if (1) any of the first current I1, the second current I2, the third current I3, and the fourth current I4 exceeds a first predetermined value, or (2) ΔRdet=Rdet1-Rdet2 is greater than a second predetermined value, and otherwise determines that the connecting port is connected to the suitable powered device.

2. The inspection device of claim 1, wherein the extension period is about 0.2 to 1.5 times the application period for the second voltage V2.

3. The inspection device of claim 2, wherein the extension period is about 0.5 to 1.0 times the application period for the second voltage V2.

4. The inspection device of claim 1, wherein the first voltage V1 and the third voltage V3 are an 8 V current-limiting voltage signal with a maximum of 800 uA, the second voltage V2 and the fourth voltage V4 are an −4V current-limiting voltage signal with the maximum of 800 uA, and the first predetermined value is about 0.02 mA to 0.78 mA.

5. The inspection device of claim 4, wherein the first predetermined value is about 0.04 mA to 0.76 mA.

6. The inspection device of claim 1, wherein the first voltage V1 and the third voltage V3 are 8 V current-limiting voltage signals with a maximum of 800 uA, the second voltage V2 and the fourth voltage V4 are −4V current-limiting voltage signals with the maximum of 800 uA, and the second predetermined value is about −1000 to 1000 ohm.

7. The inspection device of claim 6, wherein the second predetermined value is about −500 to 500 ohm.

8. An inspection method of power source equipment for detecting a powered device of a power over Ethernet system, wherein the power source equipment comprises a connecting port adapted to connect to the powered device through a network wire, and wherein the inspecting device connects to the connecting port, the inspection method comprising:
    applying a plurality of testing voltage signals to the connecting port, whereas the plurality of testing voltage signal comprises, sequentially, a first voltage V1, a second voltage V2, a third voltage V3 and a fourth voltage V4, wherein the first voltage V1 and the third voltage V3 are substantially the same, the second voltage V2 and the fourth voltage V4 are substantially the same, and an application period for the fourth voltage V4 is a sum of an application period for the second period V2 with an extension period;
    measuring at the connecting port a first current I1 after a predetermined period following applying the first voltage V1, measuring a second current I2 after the predetermined period following applying the second voltage V2, measuring a third current I3 after the predetermined period following applying the third voltage V3, and measuring a fourth current I4 after the predetermined period following applying the fourth voltage V4;
    calculating a first resistance by Rdet1=(V1-V2)/(I1-I2) and a second resistance by Rdet2=(V3-V4)/(I3-I4); and
    determining that the connecting port is not connected to a suitable powered device if (1) any of the first current I1, the second current I2, the third current I3, and the fourth current I4 exceeds a first predetermined value, or (2) ΔRdet=Rdet1-Rdet2 is greater than a second predetermined value, and otherwise determining that the connecting port is connected to the suitable powered device.

9. The inspection method of claim 8, wherein the extension period is about 0.2 to 1.5 times the application period for the second voltage V2.

10. The inspection method of claim 9, wherein the extension period is about 0.5 to 1.0 times the application period for the second voltage V2.

11. The inspection method of claim 8, wherein the first voltage V1 and the third voltage V3 are an 8 V current-limiting voltage signal with a maximum of 800 uA, the second voltage V2 and the fourth voltage V4 are an −4V current-limiting voltage signal with the maximum of 800 uA, and the first predetermined value is about 0.02 mA to 0.78 mA.

12. The inspection method of claim 11, wherein the first predetermined value is about 0.04 mA to 0.76 mA.

13. The inspection method of claim 8, wherein the first voltage V1 and the third voltage V3 are 8 V current-limiting voltage signals with a maximum of 800 uA, the second voltage V2 and the fourth voltage V4 are −4V current-limiting voltage signals with the maximum of 800 uA, and the second predetermined value is about −1000 to 1000 ohm.

14. The inspection method of claim 13, wherein the second predetermined value is about −500 to 500 ohm.

\* \* \* \* \*